United States Patent [19]
Rannenberg

[11] 3,869,266
[45] Mar. 4, 1975

[54] SELF-CLEANING COALESCER

[75] Inventor: George C. Rannenberg, Canton, Conn.

[73] Assignee: United Aircraft Corporation, East Hartford, Conn.

[22] Filed: Apr. 26, 1974

[21] Appl. No.: 464,710

[52] U.S. Cl.................. 55/309, 55/328, 55/337, 55/400, 55/DIG. 25
[51] Int. Cl............................................ B01d 46/40
[58] Field of Search ............ 55/306, 307, 309, 315, 55/317, 326, 327, 328, 329, 337, 290, 301, 400, 422, DIG. 25; 60/39.09 D, 39.09 P; 137/15.1; 244/53 B, 134 R

[56] References Cited
UNITED STATES PATENTS

| | | | |
|---|---|---|---|
| 1,103,249 | 7/1914 | Bassett | 55/422 |
| 1,292,561 | 1/1919 | Baldwin | 55/DIG. 25 |
| 1,548,288 | 8/1925 | Smith | 55/DIG. 25 |
| 2,061,247 | 11/1936 | Nordstrom | 55/400 X |
| 2,509,300 | 5/1950 | Hendrickson | 55/422 X |
| 2,823,760 | 2/1958 | Anderson | 55/DIG. 25 |
| 3,339,349 | 9/1967 | Farnum | 55/309 |
| 3,616,617 | 11/1971 | DeGroote | 55/307 |
| 3,662,524 | 5/1972 | Cuzdar | 55/400 |
| 3,756,416 | 9/1973 | Wood | 55/309 X |

Primary Examiner—Frank W. Lutter
Assistant Examiner—David L. Lacey
Attorney, Agent, or Firm—Norman Friedland

[57] ABSTRACT

A rotating drum or paddle like element carrying coalescer material exposed to the airstream in an aircraft water separator, exposes the face of the material to the upstream and downstream side of the airstream so that the air flow carries away the undesirable foreign matter collected by the coalescing material.

5 Claims, 3 Drawing Figures

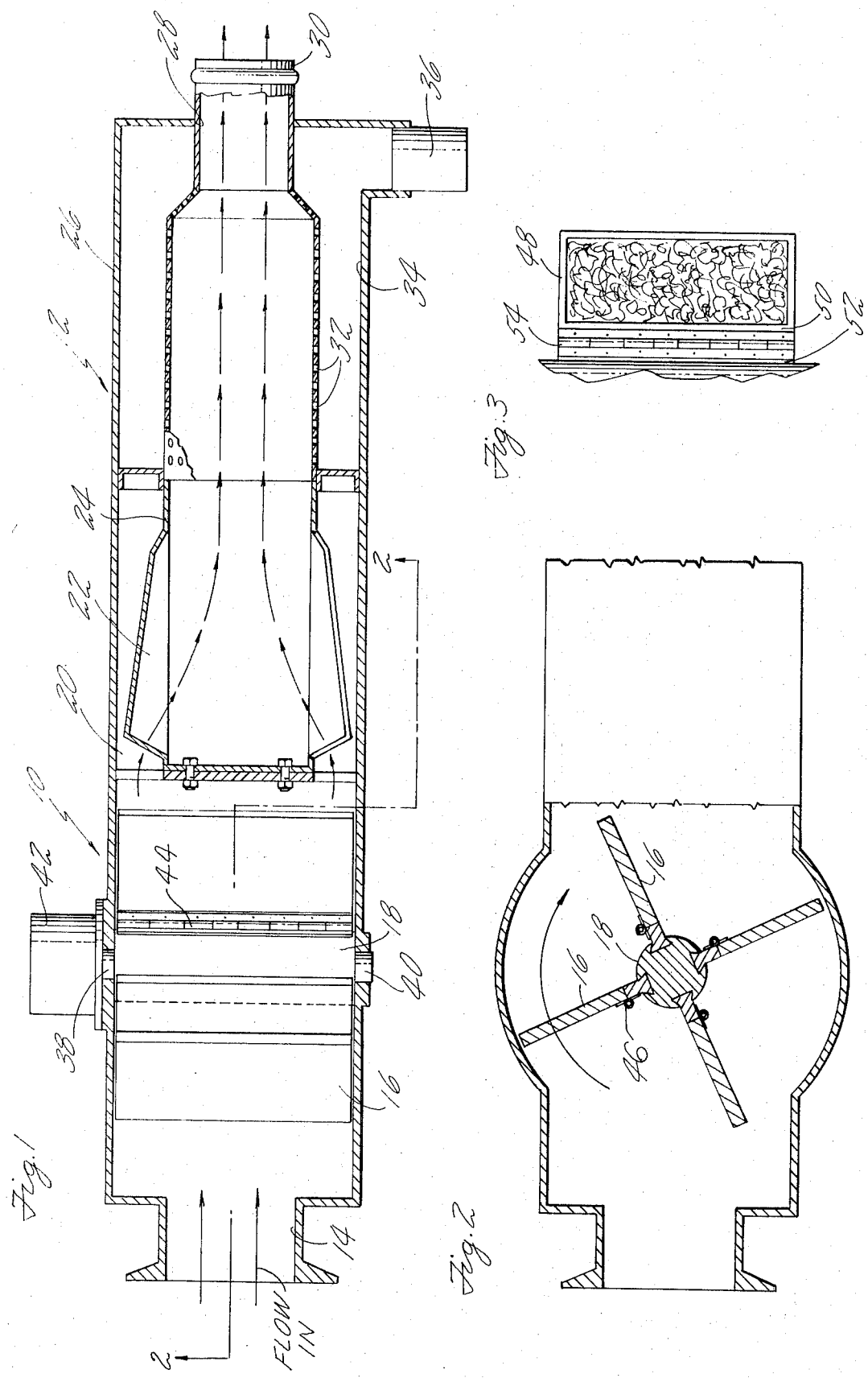

SELF-CLEANING COALESCER

BACKGROUND OF THE INVENTION

As is well known coalescers are customarily employed in the water separators of aircraft airconditioning systems and serves to agglomerate the fine water particles condensed by the airconditioning systems turbine. A typical water separator with a coalescer is described in U.S. Pat. No. 3,339,349 granted to R. F. Farnum on Sept. 5, 1967 and assigned to the same assignee which is incorporated by reference herein.

The heretofore known coalescing material, as the ones described in U.S. Pat. No. 3,339,349, supra, inherently behaves as a filter such that the dirt and dust builds up and are moistened to form a muddy substance, adversely affecting the performance of the water separator. As a compromise, the water separator provides a bypass that bypasses the coalescer when the condition is untolerable and as a consequence permits the fine water particles to discharge into the cabin. This is obviously an unwanted situation. Eventually the coalescer is removed and replaced by a cleaned or new one.

In current day aircraft airconditioning systems the coalescer is the shortest service-life component. The problem is more acute and aggravated in a helicopter since the helicopter has a propensity of picking-up dirt and dust and often lands on and takes off from a non-paved runway. To demonstrate the seriousness of the problems it is common practice to remove the coalescer from conventional aircraft every 200 hours of service time, while the helicopter may require but, 2 hours.

I have found means to obviate the problems noted above by providing a rotating coalescer that is disposed in the airstream such that the build-up of dirt and mud filtered out by the coalescer is exposed downstream of the airstream so as to be blown-off and carried away thereby. When the coalescer material is supported in a plurality of paddle wheels it can be hinged and spring-loaded closed, so that in the event the pressure drop increases beyond a predetermined value it will open, so as to bypass the coalescer such as is the case of the heretofore known types of pressure relief bypass valves of the conventional water separator.

SUMMARY OF THE INVENTION

An object of this invention is to provide for a water separator in an aircraft airconditioning system, means for rotating the coalescing material so that the dirt picked up on the front side is blown off the back side upon rotation thereof.

A still further object of this invention is to provide a plurality of paddles circumferentially supporting coalescing material in a water separator and being hingedly mounted to bypass the coalescing material when the pressure drop exceeds a predetermined value.

Other features and advantages will be apparent from the specification and claims and from the accompanying drawings which illustrate an embodiment of the invention.

BRIEF DESCRIPTION OF THE DRAWINGS

FIG. 1 is a side view partially in elevation and partially in schematic illustrating the details of this invention.

FIG. 2 is a top view of FIG. 1.

FIG. 3 is a partial view in elevation illustrating the paddle wheel with another type of coalescing material and bypass arrangement.

DESCRIPTION OF THE PREFERRED EMBODIMENT

Reference is now made to FIGS. 1 and 2 illustrating the preferred embodiment of this invention comprising a coalescer section generally illustrated by reference numeral 10 and the water separating and collecting section generally illustrated by numeral 12. The water entrained airstream is admitted into the inlet 14 where it flows through the coalescer material supported in a plurality of paddles 16 circumferentially spaced about the support hub 18. The purpose of the coalescing material is to agglomerate, as is well known in the art, the fine mist into larger droplets so that the water droplets can be effectively separated from the airstream. Any well known commercially available coalescing material either of the sintered metal or matted Teflon fibers and the like may be utilized for this purpose.

While not necessarily limited thereto, the preferred embodiment utilizes a centrifuge type of separator which is similar in construction as the one described in U.S. Pat. No. 3,339,349 supra. Suffice it to say that the air discharging through the coalescing material is conducted to the outer annular passage 20 having disposed therein a plurality of swirl vanes 22 stamped out of the cylindrically shaped hollow member 24 centrally supported in the casing 26. The discharge end 28 is necked down and is funnel shaped fairing into the duct receiving end 30 which connects to the duct network (not shown) of the airconditioning system. Thus, the airstream flowing through the coalescer is conducted to the swirl vanes where it is directed inwardly toward the center of cylinder 24. Owing to the rotational velocity imparted to the airstream the heavier water droplets are centrifuged and discharged through the apertures 32 formed in cylinder 24 downstream of the swirl vanes. The water collects due to gravity, at the bottom of the collecting chamber 34 and flows to the discharge port 36.

Hub 18 is suitably supported to casing 26 in any well known manner as for example by the trunnion 38 and 40 for rotary motion. Motor 42 which may be any type, pneumatic, hydraulic or as shown electric, suitably attached to casing 26 serves to impart rotary motion to the hub 18 for rotating it either continuously or intermittently.

From the foregoing it is apparent that as the hub rotates the front face of coalescer 16 will eventually become the back face relative to the flow stream. Thus, the dirt particles which have been filtered out by the coalescer material, that has been moistened by the water droplets to form mud, will be blown off and carried with the airstream into the separating and collection section to be separated similar to the water droplets.

As can be seen in FIGS. 1 and 2 the paddle wheels are hingedly connected in any well known manner as for example by a piano hinge 44 and is spring loaded in the extended position as shown. Whenever the pressure drop across the coalescer exceeds a predetermined amount, that is sufficient force to overcome leaf spring 46 the paddle will swing permitting the airstream to bypass the coalescer. When the coalescer material is fabricated from a sintered metal material, or any porous material that has sufficient structure the paddle wheel may be formed by the coalescer itself. However, if the coalescer is formed from a matted or woven fabric a frame 48 as shown in FIG. 3 it may be necessary to provide the structural support. In this embodiment the frame is formed in two support members 50 and 52, where member 52 is secured to the hub and member 50 is hingedly connected to member 52 by piano hinge 54. Any well known spring arrangement as for example a commercially available torsional spring may be employed to spring load the paddle wheel.

It should be understood that the invention is not limited to the particular embodiments shown and described herein, but that various changes and modifications may be made without departing from the spirit or scope of this novel concept as defined by the following claims.

I claim:

1. A coalescer in combination with a water separator for aircraft air cycle airconditioning system which air contains foreign matter, a casing having an inlet and outlet, water separating means for centrifuging the heavy particles in the airstream out of the airstream in said casing, said coalescer in said casing between said inlet and outlet and upstream of said water separating means, said coalescer having coalescing material extending radially from an axis disposed transverse to said outlet in said casing and substantially continuously rotated about said axis so that the air flow from said inlet passes through said coalescing material depositing said foreign matter on the face of said coalescer material when facing said inlet before being admitted into said water separating means and said foreign matter being picked up from said coalescer material by the airstream when said face is rotated in a position to face said outlet whereby the foreign matter collected by the coalescer material is blown-off and discharged into the water separating means and separated out from said airstream thereby.

2. A coalescer as claimed in claim 1 including a hub mounted in said casing on said axis, paddles supporting the coalescer material extending radially from and supported to said hub.

3. A coalescer as claimed in claim 2 including means for positioning said coalescer material so as to be by-passed whenever the pressure drop thereacross reaches a predetermined value.

4. A coalescer as claimed in claim 1 including a hub mounted in said casing on said axis, the coalescer material extending radially from said hub terminating in proximity to the inner wall of said casing and supported by said hub.

5. A coalescer as claimed in claim 1 including hub means mounted in said casing on said axis supporting said coalescing material, hinge means for supporting said coalescer material, and spring means preloading said coalescer material in an extended position so that said airstream collapses said coalescer material whenever the pressure drop thereacross reaches a predetermined value.

* * * * *